United States Patent
Wang et al.

(10) Patent No.: US 9,685,655 B2
(45) Date of Patent: Jun. 20, 2017

(54) COMPLEX SHOWERHEAD COATING APPARATUS WITH ELECTROSPRAY FOR LITHIUM ION BATTERY

(71) Applicant: Applied Materials, Inc., Santa Clara, CA (US)

(72) Inventors: Fei C. Wang, Fremont, CA (US); Hooman Bolandi, San Jose, CA (US); Connie P. Wang, Mountain View, CA (US); Victor Pebenito, San Jose, CA (US); Siqing Lu, San Jose, CA (US); Michael C. Kutney, Santa Clara, CA (US); Joseph G. Gordon, San Jose, CA (US); Robert Z. Bachrach, Burlingame, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 14/773,146

(22) PCT Filed: Mar. 6, 2014

(86) PCT No.: PCT/US2014/021408
§ 371 (c)(1),
(2) Date: Sep. 4, 2015

(87) PCT Pub. No.: WO2014/149898
PCT Pub. Date: Sep. 25, 2014

(65) Prior Publication Data
US 2016/0020454 A1    Jan. 21, 2016

Related U.S. Application Data

(60) Provisional application No. 61/788,134, filed on Mar. 15, 2013.

(51) Int. Cl.
*B05B 5/025* (2006.01)
*H01M 4/04* (2006.01)
(Continued)

(52) U.S. Cl.
CPC .......... *H01M 4/0419* (2013.01); *B05B 5/025* (2013.01); *B05B 13/0221* (2013.01);
(Continued)

(58) Field of Classification Search
None
See application file for complete search history.

(56) References Cited

U.S. PATENT DOCUMENTS 3,970,249 A * 7/1976 Singer .................. B05B 7/0861
118/63
4,748,043 A * 5/1988 Seaver .................. B05B 5/002
118/630

(Continued)

FOREIGN PATENT DOCUMENTS

KR     101177545 B1   8/2012
WO    2006009854 A2   1/2006

OTHER PUBLICATIONS

International Search Report and Written Opinion, PCT/US2014/021408, Jun. 24, 2014.

*Primary Examiner* — Charles Capozzi
(74) *Attorney, Agent, or Firm* — Patterson + Sheridan, LLP

(57) ABSTRACT

A method and apparatus for forming battery active material on a substrate are disclosed. In one embodiment, an apparatus for depositing a battery active material on a surface of a substrate includes a substrate conveyor system for transporting the substrate within the apparatus, a material spray assembly disposed above the substrate conveyor system, and a first heating element disposed adjacent to the material
(Continued)

spray assembly above the substrate conveyor system configured to heat the substrate. The material spray assembly has a 2-D array of nozzles configured to electrospray an electrode forming solution on the surface of the substrate.

19 Claims, 6 Drawing Sheets

(51) Int. Cl.
- *H01M 4/139* (2010.01)
- *H01M 4/1391* (2010.01)
- *B05B 13/02* (2006.01)
- *H01M 4/1393* (2010.01)
- *H01M 4/1395* (2010.01)
- *H01M 4/1397* (2010.01)
- *H01M 4/36* (2006.01)

(52) U.S. Cl.
CPC ......... *H01M 4/0404* (2013.01); *H01M 4/139* (2013.01); *H01M 4/1391* (2013.01); *H01M 4/1393* (2013.01); *H01M 4/1395* (2013.01); *H01M 4/1397* (2013.01); *H01M 4/366* (2013.01)

(56) References Cited

U.S. PATENT DOCUMENTS

| | | | |
|---|---|---|---|
| 2009/0303272 A1* | 12/2009 | Jung | B41J 2/2139 347/14 |
| 2009/0317558 A1* | 12/2009 | Bhatnagar | B05B 5/0255 427/457 |
| 2011/0045170 A1 | 2/2011 | Shang et al. | |
| 2011/0274850 A1 | 11/2011 | Yang et al. | |
| 2012/0064225 A1 | 3/2012 | Bachrach et al. | |
| 2013/0089668 A1* | 4/2013 | Inagaki | H01L 21/6715 427/261 |
| 2013/0309414 A1* | 11/2013 | Eskra | H01M 4/0404 427/557 |

\* cited by examiner

COMPLEX SHOWERHEAD COATING APPARATUS WITH ELECTROSPRAY FOR LITHIUM ION BATTERY

BACKGROUND OF THE INVENTION

Field of the Invention

Embodiments of the present invention relate generally to high-capacity energy storage devices and methods and apparati for fabricating high-capacity energy storage devices. More specifically, methods and apparati for material spray deposition of high solid percentage slurries for forming battery active materials are disclosed.

Description of the Related Art

High-capacity energy storage devices, such as lithium-ion (Li-ion) batteries, are used in a growing number of applications, including portable electronics, medical devices, transportation, grid-connected large energy storage, renewable energy storage, and uninterruptible power supplies (UPS).

Li-ion batteries typically include an anode electrode, a cathode electrode and a separator positioned between the anode electrode and the cathode electrode. Lithium is stored in the active materials in the electrodes. The active electrode material in the positive electrode of a Li-ion battery is typically selected from lithium transition metal oxides, such as $LiMn_2O_4$, $LiCoO_2$, LiFePO4, $LiNiO_2$, or combinations of Ni, Li, Mn, and Co oxides and includes electroconductive particles, such as carbon or graphite, and binder material. Graphite and MCMB (meso carbon micro beads) are usually used as the active electrode material of the negative electrode, such electrode having a mean diameter of approximately 10 μm. Lithium-intercalation MCMB or graphite powder is dispersed in a polymeric binder matrix. The typical polymers for the binder matrix include PVDF (Polyvinylidene fluoride), SBR (Styrene-Butadiene Rubber), CMC (Carboxymethyl cellulose). The polymeric binder serves to bind together the active material powders to preclude crack formation and prevent disintegration of the active material powder on the surface of the current collector, as well as for good adhesion to the substrate. The quantity of polymeric binder may be in the range of 2% to 30% by weight. The separator of Li-ion batteries is typically made from microporous polyolefin polymer, such as polyethylene foam, and is applied in a separate manufacturing step.

For most energy storage applications, the charge time and capacity of energy storage devices are important parameters. In addition, the size, weight, and/or expense of such energy storage devices can be significant limitations.

One method for manufacturing anode electrodes and cathode electrodes for energy storage devices is principally based on slit coating of viscous solvent-based powder slurry mixtures of cathodically or anodically active material onto a conductive current collector followed by prolonged heating to form a dried cast sheet. A slow drying process is needed in order to prevent cracking in thick coatings and, as a result, the length of the dryers must be very long. The thickness of the electrode after drying which evaporates the solvents is finally determined by compression or calendering which adjusts the density and porosity of the final layer. Slit coating of viscous slurries is a highly developed manufacturing technology which is very dependent on the formulation, formation, and homogenation of the slurry. The formed active layer is extremely sensitive to the rate and thermal details of the drying process.

Among other problems and limitations of this technology is the slow and costly drying component which requires both a large footprint (e.g., up to 70 to 90 meters long) at coating speeds of 5-40 meters/min, and an elaborate collection and recycling system for the evaporated volatile components. Many of these are volatile organic compounds which additionally require an elaborate abatement system. Further, the resulting electrical conductivity of these types of electrodes also limits the thickness of the electrode and thus the energy density of the battery cells.

Accordingly, there is a need in the art for high volume, cost effective manufacturing processes and apparatus for manufacturing high-capacity energy storage devices.

SUMMARY OF THE INVENTION

Embodiments described herein include a material spray deposition system, including at least a substrate conveyor system and a electrode forming solution dispenser. In one embodiment, an apparatus for depositing a battery active material on a surface of a substrate includes a substrate conveyor system, a material spray assembly disposed above the substrate conveyor system, and a first heating element disposed adjacent to the material spray assembly above the substrate conveyor system.

A method and apparatus for forming battery active material on a substrate are disclosed. In one embodiment, an apparatus for depositing a battery active material on a surface of a substrate includes a substrate conveyor system for transporting the substrate within the apparatus, a material spray assembly disposed above the substrate conveyor system, and a first heating element disposed adjacent to the material spray assembly above the substrate conveyor system configured to heat the substrate. The material spray assembly has a 2-D array of nozzles configured to electrospray an electrode forming solution on the surface of the substrate.

In another embodiment, an apparatus for depositing a battery active material on a surface of a substrate includes a substrate conveyor system for transporting the substrate within the apparatus, a plurality of material spray assemblies disposed above the substrate conveyor system, and a plurality of heating elements disposed between the material spray assembly above the substrate conveyor system configured to heat the substrate. The material spray assemblies each have a 2-D array of nozzles configured to electrospray an electrode forming solution on the surface of the substrate while disposed on the conveyer system. At least one of the 2-D array of nozzles has a row of nozzles having nozzle to nozzle spacing of between about 9 mm to about 30 mm.

In other embodiments, the 2-D array of nozzles on at least one of the material spray assemblies further includes a first nozzle disposed at an edge of the material spray assembly and a second nozzle disposed inward of the first nozzle, the first nozzle having an inward inclination relative to the second nozzle.

In other embodiments, at least one of the material spray assemblies includes a plurality of dummy nozzles disposed on the material spray assembly outward of the 2-D array of nozzles.

In other embodiments, the 2-D array of nozzles on at least one of the material spray assemblies includes a first column offset from a second column.

In other embodiments, at least one of the material spray assemblies includes an air curtain generator configured to deflect a trajectory of spray exiting adjacent nozzles inward.

In yet other embodiments, a method for depositing a battery active material on a surface of a substrate is provided that includes electrospraying an electrode forming solution from at least one material electrospray dispenser assembly onto a substrate, and heating the deposition materials disposed on the substrate by a plurality of heaters disposed adjacent to the material electrospray dispenser assembly.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The methods and apparatus described herein include a material spray deposition system including at least a substrate conveyor system and a material deposition spray assembly disposed adjacent to the substrate conveyor system. The material spray assembly includes a 2-D array of nozzles configured to deposit material having good center to edge thickness uniformity, good homogeneity through the film thickness, and to enable rapid deposition rates. The material spray deposition system is particularly useful in depositing material layer(s) utilized for electrode structures, such as battery active material layers, from high solid content electrode forming solutions.

Figure 1:
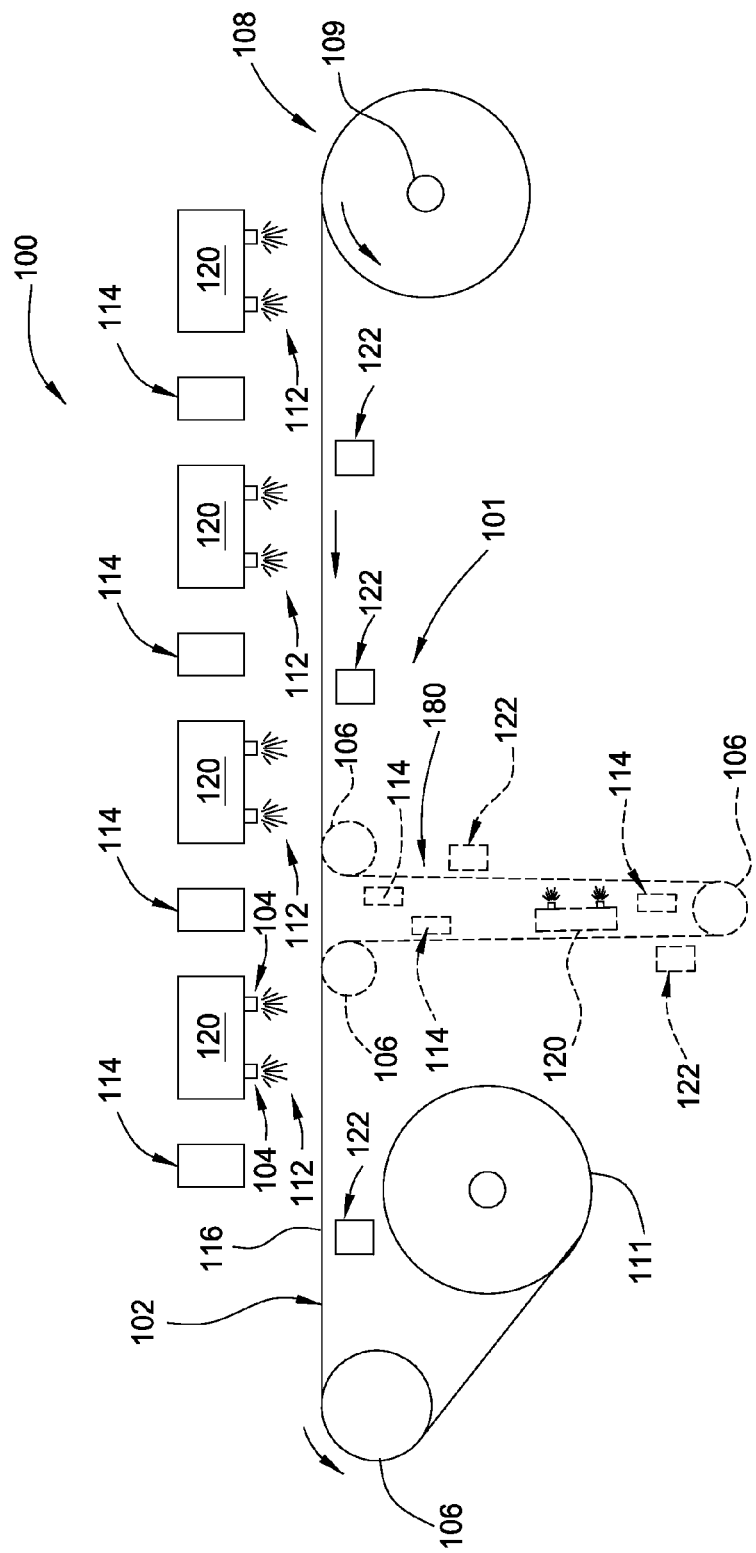
FIG. 1 is a schematic diagram of one embodiment of a material spray deposition system for forming a battery-active material layer on a substrate.

FIG. 1 is a schematic diagram of material spray deposition system 100 for depositing a battery-active material layer on a substrate. It is contemplated that aspects of the invention may be adapted for use in other spray deposition systems. The material spray deposition system 100 includes one or more material electrospray dispenser assembly 120 having a 2-D array of nozzles 104 disposed adjacent a substrate conveyor system 101. The substrate conveyor system 101 is configured to pass one or more substrates 102 proximate the electrospray dispenser assembly 120 so that material electrospray dispenser assembly 120 can deposit a material onto the substrate 102. For example, the substrate conveyor system 101 may be configured to move a series of discrete substrates 102 past the electrospray dispenser assembly 120. Alternatively, the substrate conveyor system 101 may be configured to move a substrate 102 in web form past the electrospray dispenser assembly 120, either as a continuous belt or as a roll-to-roll web. As such, the substrate 102 may be in the form of a pad, a foil, a thin plate, a film, a belt, a web, or discrete workpieces. In the embodiment depicted in FIG. 1, the substrate 102 is in the form of a web fabricated from a metallic foil having a thickness that generally ranges between about 6 µm to about 50 µm. In one embodiment, the substrate 102 is aluminum foil in a web form.

The substrate conveyor system 101 includes a supply roll 108, at least one conveying roller 106, and a take-up roll 111. The conveying roller may optionally be heated to assist drying deposition materials on the substrate 102. The supply roll 108 that contains at least a portion of substrate 102 is wound on a core 109. The substrate 102 is fed from the supply roll 108 across to the conveying roller 106 to expose a surface 116 of the substrate 102 to a spray of materials, for example electrode forming solution 112, exiting the nozzles 104 of the at least one electrospray dispenser assembly 120.

The number of electrospray dispenser assemblies 120 utilized in the system 100 may depend in part on the desired thickness of the material film to be deposited. In the embodiment depicted in FIG. 1, four electrospray dispenser assemblies 120 are illustrated. However, the deposition system 100 may be configured with any desired number of electrospray dispenser assemblies 120.

In the embodiment depicted in FIG. 1, the plurality of electrospray dispenser assemblies 120 are shown linearly aligned above the substrate 102, wherein the substrate 102 extends horizontally between the supply roll 108 and the roller 106. However, the substrate 102 may be routed in other directions between the electrospray dispenser assemblies 120 to increase drying time without extending the overall length of the deposition system 100. For example, the conveyor system 101 may include one or more substantially vertical paths 180, one of which is shown in phantom in FIG. 1, which routes the substrate 102 to a roller 106 to create a serpentine path for the substrate that increases the dwell time of the substrate 102 on the conveyor system 101 after passing one of the electrospray dispenser assemblies 120 and prior to being collected on the take-up roll 111.

Although all the electrospray dispenser assemblies 120 are primarily shown in FIG. 1 with their nozzles 104 directly vertically downward towards the surface 116 of substrate 102, one or more, or even all of the electrospray dispenser assemblies 120 may be positioned to spray material onto the substrate 102 while the substrate 102 is being routed along one or more of the vertical paths 180.

As briefly discussed above, the material electrospray dispenser assembly 120 is utilized to spray deposit deposition materials on the substrate 102, for example, using an electrospray process. The deposition materials deposited on the substrate 102 may be a battery-active material layer. More specifically in the embodiment depicted in FIG. 1, the material electrospray dispenser assembly 120 is positioned above the substrate 102 and is configured to spray deposition materials (i.e., electrode forming solution 112) onto the substrate 102. Each of the material electrospray dispenser assemblies 120 are configured to supply, for example, electrospray, the electrode forming solution 112 distributed across the entire width of the substrate 102 in a single pass so as to deposit the battery-active material layer with uniform thickness and surface roughness across the substrate 102.

The material spray deposition system 100 may include a plurality of heaters 114 that may be distributed along the conveyor system 101 to more efficiently dry the deposited material either for collection or subsequent deposition of additional material for increasing the thickness of the deposited layer. The heaters 114 may assist drying the electrode forming solution 112 sprayed onto the substrate 102 so as to enhance adhesion of the electrode forming solution 112 to the substrate 102, and to ensure that the electrode forming solution 112 dries uniformly into a homogeneous layer (i.e., no trapped volatiles residual from the solution 112). In the embodiment depicted in FIG. 1, a respective heater 114 is located downstream (i.e., in the direction of substrate travel) and is disposed adjacent to each of the material electrospray dispenser assembly 120. As the electrode forming solution 112 is sprayed onto the substrate surface 116, the thermal energy from the heaters 114 assist drying the deposited material and evaporating the volatiles from the electrode forming solution 112. A backside heater 122 may be disposed on the side of the substrate 102 opposite the heater 114. The backside heater 122 may also assist drying the electrode forming solution 112 sprayed onto the substrate 102. One or more of the heaters 114, 122 may be positioned to engage the substrate 102 while the substrate 102 is routed along the substantially vertical path 180 (if present). As discussed above, the rollers 106 may also be heated to assist drying of the material deposited on the substrate 102. It is noted that the number, locations, and configurations of the heaters disposed in the material spray deposition system 100 may be varied as desired.

In one embodiment, the heaters 114 may provide light radiation to heat the substrate 102. The light radiation from the heater 114 (i.e., thermal energy) may be used to control the temperature of the substrate 102 to between about 10 degrees Celsius and about 250 degrees Celsius. The heaters 122 may be similarly configured.

Figure 2A:
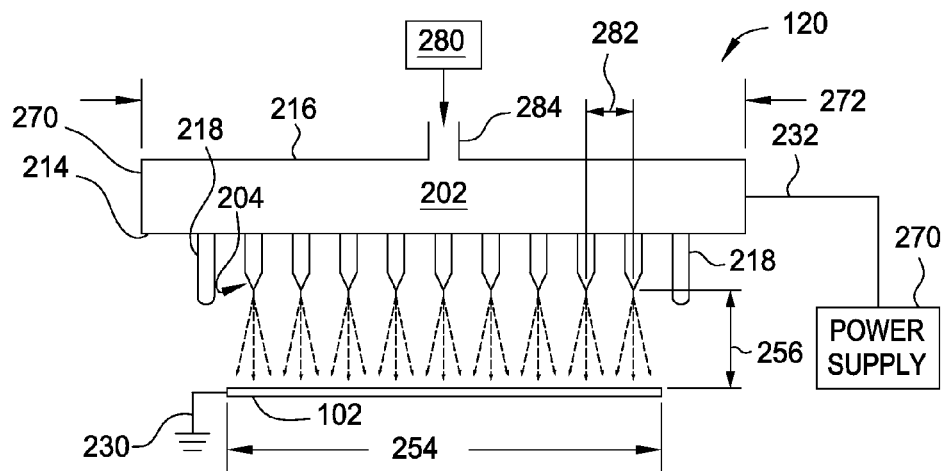
FIG. 2A is a schematic diagram of a material spray dispenser assembly disposed in the material spray deposition system depicted in FIG. 1.

FIG. 2A depicts a side view of the material electrospray dispenser assembly 120 depicted in FIG. 1. The material electrospray dispenser assembly 120 includes a manifold 202 having a top surface 216 and a lower surface 214. The 2-D array of nozzles 104 extend from the lower surface 214 of the manifold 202. The lower surface 214 of the manifold 202 is substantially parallel to the portion of the substrate 102 positioned adjacent thereto by the substrate conveyor system 101, while in most embodiments, at least some of the nozzles 104 are oriented perpendicular to both the lower surface 214 and adjacent surface of the substrate 102. A fluid passage 284 may be formed on the top surface 216 of the manifold 202 to supply deposition material (i.e., the electrode forming solution 112) from a deposition material source 280. In one embodiment, the manifold 202 may be fabricated from a conductive material, such as aluminum, stainless steel, tungsten, copper, molybdenum, nickel, alloys thereof, combinations thereof, other suitable metal material or the like.

The electrode forming solution 112 supplied from the deposition material source 280 may comprise an electroactive material and an electro-conductive material. The electro-active material and the electro-conductive material may be in a water-based solution. The electrode forming solution 112 may also include a solvent, such as N-Methylpyrollidone (NMP) or other suitable solvent, or water. The electrode forming solution 112 may optionally include at least one of a binding agent and a drying agent. The electrode forming solution 112 may have a baseline conductivity of at least about $10^{-5}$ Siemens/meter.

Exemplary electro-active materials which may be deposited using the embodiments described herein include, but are not limited to, cathodically active particles selected from the group comprising lithium cobalt dioxide ($LiCoO_2$), lithium manganese dioxide ($LiMnO_2$), titanium disulfide ($TiS_2$), $LiNixCo_{1-2x}MnO_2$, $LiMn_2O_4$, iron olivine ($LiFePO_4$) and its variants (such as $LiFe_{1-x}MgPO_4$), $LiMoPO_4$, $LiCoPO_4$, $Li_3V_2(PO_4)_3$, $LiVOPO_4$, $LiMP_2O_7$, $LiFe_{1.5}P_2O_7$, $LiVPO_4F$, $LiAlPO_4F$, $Li_5V(PO_4)_2F_2$, $Li_5Cr(PO_4)_2F_2$, $Li_2CoPO_4F$, $Li_2NiPO_4F$, $Na_5V_2(PO_4)_2F_3$, $Li_2FeSiO_4$, $Li_2MnSiO_4$, $Li_2VOSiO_4$, other qualified powders, composites thereof, and combinations thereof.

Other exemplary electro-active materials which may be deposited using the embodiments described herein include but are not limited to anodically active particles selected from the group comprising graphite, graphene hard carbon, carbon black, carbon coated silicon, tin particles, copper-tin particles, tin oxide, silicon carbide, silicon (amorphous or crystalline), silicon alloys, doped silicon, lithium titanate, any other appropriately electro-active powder, composites thereof, and combinations thereof.

Exemplary drying agents include, but are not limited to, isopropyl alcohol, methanol, and acetone. Exemplary binding agents include, but are not limited to, polyvinylidene difluoride (PVDF) and water-soluble binding agents, such as styrene butadiene rubber (SBR) and sodium carboxymethyl cellulose (CMC). Exemplary electro-conductive materials include, but are not limited to, carbon black ("CB") and acetylene black ("AB").

The electrode forming solution may have a solids content greater than 30 percent by weight (wt. %), such as between about 30 wt. % and about 85 wt. %. In one embodiment, the electrode forming solution may have a solids content of between about 40 wt. % and about 70 wt. %, such as between about 50 wt. % and about 60 wt. %.

Conventionally, electrospray technology is limited for use with solid-free liquids or liquids containing particles less than 1 micrometer. The embodiments described herein enable electrospraying of solutions having much larger particle sizes. The solids within the electrode forming solution generally have a particle size larger than conventional deposition systems, thereby allowing higher deposition rates. For example, solid particles within the electrode forming solution may have a mean diameter in the range of between about 1.0 µm to about 20.0 µm, such as between about 3.0 µm to about 15.0 µm. The solids present in the electrode forming solution comprise at least one or both of active material and conductive material. The only known technology which can utilize such a large particle size for battery active material deposition are slit coating systems. As discussed above, slit coating systems suffer from long drying times and film cracking, and additionally suffer from poor thickness uniformity control, making slit coating systems undesirable for next generation battery devices. As described herein, the material electrospray dispenser assembly 120 enables rapid deposition of high solid content battery active materials with good uniformity control in a system having a cost effective, smaller footprint with no film cracking problems, thereby enhancing development and fabrication of next generation battery devices.

The plurality of nozzles 104 coupled to the manifold 202 may have different configurations, lengths, shape, features, and numbers to meet different process requirements. In the embodiment depicted in FIG. 2A, the nozzles 104 may be in the form of a single straight cylinder, cone shape, square shape, oval shape, or any other different configurations as needed. Details regarding one configuration of nozzles 104 will be described below with reference to FIG. 7.

The nozzle 104 may have distance 256 defined between the distal end of the nozzle 104 and the substrate 102 disposed on the conveyor system 101. The distance 256 between the nozzle 104 and substrate 102 affects the size of the spray cone of the material exiting the nozzle 104, along with the associated electric fields within the material electrospray dispenser assembly 120. In one embodiment, the nozzle 104 may have distance 256 of between about 10 mm and about 60 mm, for example about 15 mm and about 40 mm, to the substrate 102 disposed on the conveyor system 101.

A first circuit arrangement 232 couples the material electrospray dispenser assembly 120 to a power source 220. The first circuit arrangement 232 is adapted to provide power to the material electrospray dispenser assembly 120. In operation, the manifold 202 acts as an electrode. A voltage may be applied to the manifold 202 (and nozzles 104), establishing an electric field that atomizes deposition materials passing therethrough. In one embodiment, the voltage may be between about 5 KVolts and about 50 KVolts. As the substrate 102 is fabricated from a metallic material, such as an aluminum foil, the substrate 102 may also act as an electrode during operation. The electric fields accelerate the atomized electrode forming solution on to the substrate 102. The substrate 102 may be coupled to ground 230, for example, through one of the rollers 106.

In one embodiment, the plurality of the nozzles 104 coupled to the manifold 202 may have an arrangement selected so as to assist deposition materials (i.e., electrode forming solution 112) provided from the deposition material source 280 to be evenly distributed on the substrate 102. In one embodiment, dummy nozzles 218, fabricated from an electrically conductive material, for example a metal such as stainless steel, may be disposed at edges of the manifold 202 to reduce tilting of the spray exiting the outermost nozzles 204 due to an imbalance in the electric field at the last nozzle 204. In some cases, deposition materials supplied through the outermost nozzles 104 disposed at the edges of the manifold 202 may have a tilted spray trajectory compared to the spray trajectory of the inner nozzles 104, thereby adversely impacting the film uniformity at the edge of the substrate 102. In embodiments employing dummy nozzles 218 disposed around ends of the manifold 202 outward of the last nozzle 104, a voltage may be applied to the dummy nozzle 218 to create an electric field in the same manner as between the nozzles 104 and the substrate 102. Thus, the electric field may be uniformly extended laterally outward of the outer most nozzles 104 so that electric fields acting on the spray exiting the center and outer nozzles 104 are substantially the same, thereby allowing the spray trajectory to be essentially uniform (i.e., vertical) between the outermost and center nozzles 104, and enhancing center to edge deposition uniformity on the substrate 102. Although only one dummy nozzle 218 is shown at each end of the manifold 202, it is noted that the dummy nozzles may be coupled to the manifold 202 at any desirable location.

The length and voltage applied to dummy nozzles 218 relative to the nozzles 104 will affect the trajectory of the spray exiting the nozzles 104 adjacent the dummy nozzles 218. Increasing either (or both) the length and voltage applied to dummy nozzles 218 will tilt the trajectory of the spray exiting the nozzles 104 adjacent the dummy nozzles 218 inward, allowing the spray trajectory of the edge nozzles 104 to be tuned relative to the center nozzles 104. For example, the dummy nozzles 218 may be longer, shorter, or the same length as the adjacent nozzles 104. By making dummy nozzle 218 longer (i.e., shorter distance to the substrate) than the adjacent nozzle 104, the electric field strength is stronger at the dummy nozzle 218 relative to the electric field strength at the adjacent nozzle 104 when the same voltage is applied to both the dummy nozzle 218 and the adjacent nozzle 104, which helps balance the electric field repulsion force from center nozzles 104.

Figure 2B:
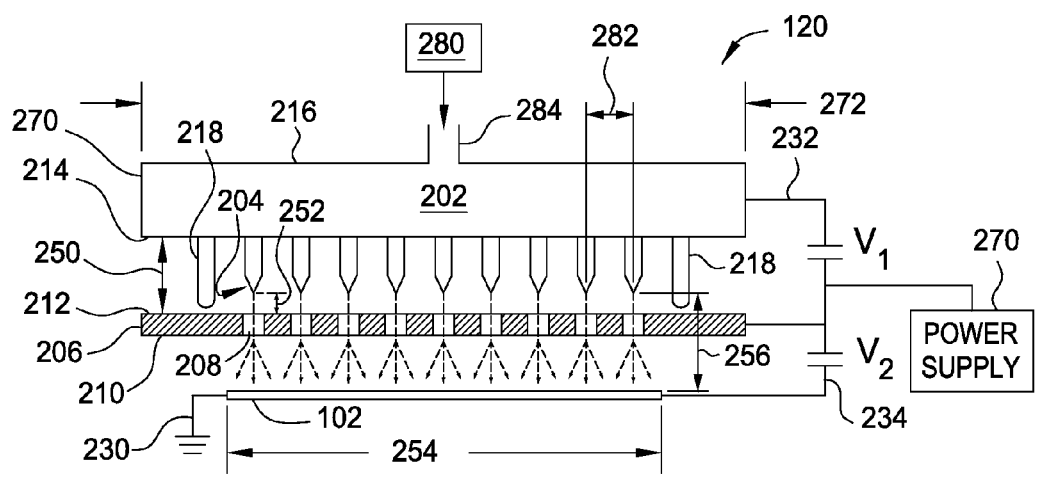
FIG. 2B is a schematic diagram of an alternative embodiment of a material spray dispenser assembly having an extractor plate.

FIG. 2B depicts a side view of the material electrospray dispenser assembly 120 depicted in FIG. 1 incorporating optional extractor plate 206. The extractor plate 206 includes a plurality of apertures 208 formed therein arranged in an array that aligns with 2-D array of nozzles 104 extending in the manifold 202. The extractor plate 206 may have an upper surface 212 facing the manifold 202 and a lower surface 210 facing the substrate 102. The upper surface 212 of the extractor plate 206 may be parallel to the lower surface 214 of the manifold 202. The extractor plate 206 may be coupled to the manifold 202 using suitable mechanical attachments, such as screws or bolts, adhesive materials or any other suitable attachment techniques. The plurality of apertures 208 in the extractor plate 206 may reactively align with the nozzles 104 coupled to the manifold 202 so as to facilitate and confine flow of the deposition materials from the deposition material source 280 to the substrate 102. In one embodiment, the lower surface 214 of the manifold 202 may have a distance 250 of between about 5 mm and about 55 mm to the upper surface 212 of the extractor plate 206. The nozzle 104 may have distance 252 of between about 10 mm and about 50 mm, to the upper surface 212 of the extractor plate 206. The nozzle 104 may have distance 256 of between about 10 mm and about 60 mm, for example about 15 mm and about 40 mm, to the substrate 102 disposed on the conveyor system 101.

In one embodiment, the apertures 208 formed in the extractor plate 206 may have a predetermined size to accommodate the flow volume of the deposition material supplied from the nozzles 104. Different sizes of the nozzle 104 may result in different flux of the deposition materials flowing therethrough, passing the apertures 208 of the extractor plate 206 to the substrate surface. In one embodiment, the diameter of the apertures 208 may be selected between about 0.3 mm and about 5 mm.

In the embodiment depicted in FIG. 2B, the first circuit arrangement 232 couples the material electrospray dispenser assembly 120 to the power source 220. As discussed above, the first circuit arrangement 232 is adapted to provide power to the material electrospray dispenser assembly 120. In operation, a first voltage $V_1$ may be applied between the manifold 202 (nozzles 104) and the extractor plate 206, establishing a first electric field that atomizes deposition materials passing therethrough. In one embodiment, the first voltage $V_1$ may be between about 5 KVolts and about 50 KVolts. A second circuit arrangement 234 is coupled between the extractor plate 206 and the substrate 102. As the substrate 102 is fabricated from a metallic material, such as an aluminum foil, the substrate 102 may also act as an electrode during operation. Similarly, a second voltage $V_2$ may be applied between the extractor plate 206 and the substrate 102, establishing a second electric field to enable acceleration of the atomized electrode forming solutions passing through the apertures 208 in the extractor plate 206 on to the substrate 102. The second voltage $V_2$ may be between 5 KVolts and about 50 KVolts. The substrate 102 may be coupled to ground 230, for example, through one of the rollers 106. The second voltage $V_2$ may be greater than the first voltage $V_1$, for example by about 5 KVolts.

In embodiments employing dummy nozzles 218 disposed around ends of the manifold 202 outward of the last nozzle 104, a voltage may be applied to the dummy nozzle 218 to create an electric field with the extractor plate 206 in the same manner as between the nozzles 104 and the extractor plate 206. The length and voltage applied to dummy nozzles 218 relative to the nozzles 104 may vary as desired as discussed above to tune the electric field. Thus, the electric field may be uniformly extended laterally outward of the outer most nozzles 104 so that electric fields acting on the spray exiting the center and outer nozzles 104 are substantially the same, thereby allowing the spray trajectory to be essentially uniform (i.e., vertical) between the outermost and center nozzles 104, and enhancing center to edge deposition uniformity on the substrate 102. Although only one dummy nozzle 218 is shown at each end of the manifold 202, it is noted that the dummy nozzles may be coupled to the manifold 202 at any desirable location.

Figure 2C:
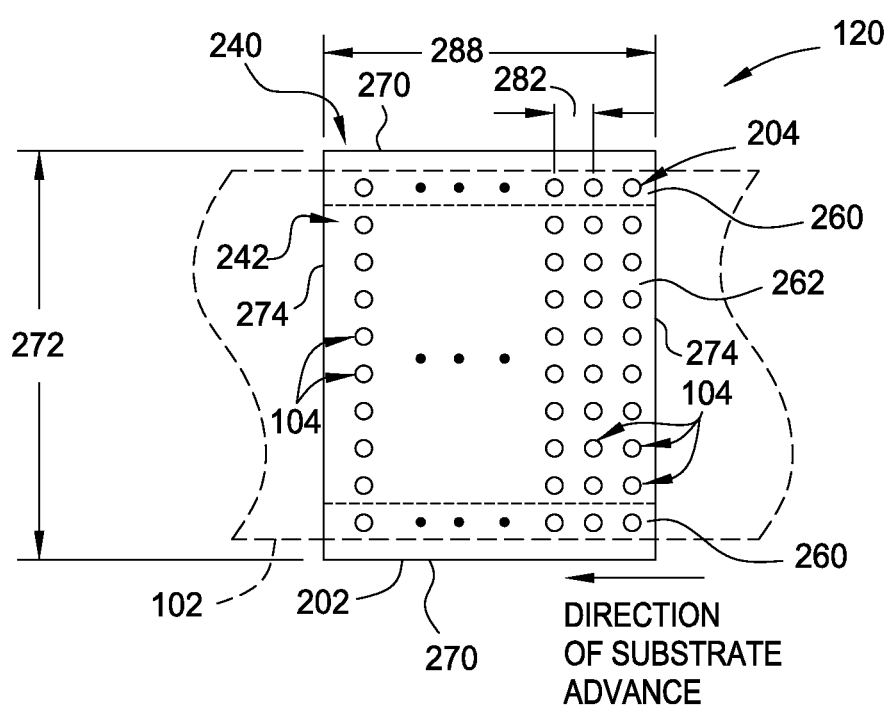
FIG. 2C is a bottom view of a material spray dispenser assembly depicted in FIG. 2A.

Returning now to the embodiment of FIG. 2A and referring additionally to the bottom view of FIG. 2C, the material electrospray dispenser assembly 120 may have a width 272 that accommodates a plurality of row 240 of nozzles 104 and a length 288 that accommodates a plurality of columns 242 of nozzles 104. In an exemplary embodiment, each row 240 may include up to about 58 or more nozzles aligned in a linear row, while each column 242 may include up to about 7 to 20 or more nozzles (one from each row). The nozzles 104 in each column 242 may be linearly aligned, or offset in a repeating manner. With the nozzles 104 arranged in a 2-D array, each row 240 of nozzles 104 of the material electrospray dispenser assembly 120 produces a spray pattern that covers the entire width 254 of the substrate 102, while the columns 242 allow for more electrode forming solution 112 to be deposited in a single pass of the substrate 102 under the material electrospray dispenser assembly 120, thereby enabling rapid deposition of the battery active material. As such, although the manifold 202 may have a width 272 greater than the width 254 of the substrate 102, a center to center distance of the outermost nozzles 104 may be slightly less than the width 254 of the substrate 102, while a center to center distance of the dummy nozzles 218 may be slightly greater than the width 254 of the substrate 102 to ensure good edge to center deposition thickness uniformity. In the embodiment depicted in FIG. 2B, the nozzles 104 of the material electrospray dispenser assembly 120 may be grouped into a plurality of zones, wherein each zone has a different flow attribute, either by the zone as a unit, or by nozzles between different zones. For example, the nozzles 104 of the material electrospray dispenser assembly 120 may be grouped into a center zone 262 disposed between edge zones 260.

In one embodiment, edge nozzles 104 disposed in the edge zones 260 may located closer to the substrate 102 than the center nozzles 104 disposed in the center zone 262. In the configuration, the edge nozzles 104 disposed in the edge zones 260 may be used with lower flow rates with the same or higher voltage than center nozzles 104 to produce good thickness control of the deposited battery active material at the edge of the substrate 102. In this example, the spray from the edge of the material electrospray dispenser assembly 120 will be more focused, thus producing a relatively sharp edge at the deposited battery active material at the edge of the substrate 102.

In some embodiments, the edge zones 260 may be linearly aligned and parallel only to the edges 270, or the edge zones 260 may extend completely around the perimeter of the manifold 202 along all four edges 270, 274, such that the nozzles 104 in the center zone 262 are surrounded by the nozzles 104 in the edge zone 260. It is contemplated that the zones may have other arrangements. Each zone 260, 262 of the material electrospray dispenser assembly 120 may differ in the number of nozzles 104, density of nozzles 104, the spacing between nozzles 104, the applied voltage, or the flow rate through the nozzles 104. In one embodiment, the center zone 262 of the material electrospray dispenser assembly 120 may have multiple rows 240 and columns 242 of nozzles 104, while the edge zones 260 respectively include only a single column 242 of nozzles 104. Dummy nozzles 218 (not shown in FIG. 2C) may also be present in the edge zones 260 as discussed above.

The 2-D arrangement of the nozzles 104 within the material electrospray dispenser assembly 120 allows for greater flow rates of high solid content electrode forming solution, which in conjunction with the high drying rates facilitated by the material spray deposition system 100, results in fast deposition of homogeneous battery-active materials with uniform center to edge thickness. For example, each nozzle 104 of the material electrospray dispenser assembly 120 may deliver about 0.15 ml/min to about 10.0 ml/min or more of high solid content (i.e., greater than 10 wt. %) electrode forming solution.

The arrangement of the nozzles 104 within the material electrospray dispenser assembly 120 allows for greater flow rates of high solid content electrode forming solution, which, in conjunction with the high drying rates facilitated by the material spray deposition system 100 or other suitable deposition system, results in fast deposition of homogeneous battery-active materials with uniform center to edge thickness. For example, each nozzle 104 of the material electrospray dispenser assembly 120 may deliver about 0.15 ml/min to about 10.0 ml/min or more, such as about 0.2 ml/min to about 2.0 ml/min, of high solid content (i.e., greater than 10 wt. %) electrode forming solution 112 to deposit battery active material at a rate of up to at least about 3 $mAh/cm^2$ at substrate advance speeds for 20 m/min.

In some embodiments, the flow through the column(s) 242 of nozzles 104 located in the edge zones 260 may be different, for example, greater or less than the flow through the columns 242 of nozzles 104 located in the center zone 262. The use of smaller flow rates in the edge zone 260 may be coupled with higher voltage applied to the nozzles 104 located in the edge zones 260 compared to the voltage applied to the nozzles 104 located in the center zone 262, which compensates for tendencies to have faster deposition in the center of the substrate 102, thereby contributing for more uniform edge to center thickness of the deposited battery active material.

In some embodiments where the edge nozzles 104 are about 5 to about 10 mm closer to the substrate 102 than the center nozzles 104, the flow rate through each nozzle 104 in the edge zone 260 may be up to half of the flow rate through each nozzle 104 in the center zone 262. Additionally, the voltage applied to each nozzle 104 in the edge zone 260 may be up to half of the voltage rate through each nozzle 104 in the center zone 262. In such embodiments, a greater density of nozzles 104 in the edge zone 260 may assist in matching the deposition rate to that of the center zone 262 as to provide uniform edge to center film deposition thickness.

Figure 3:
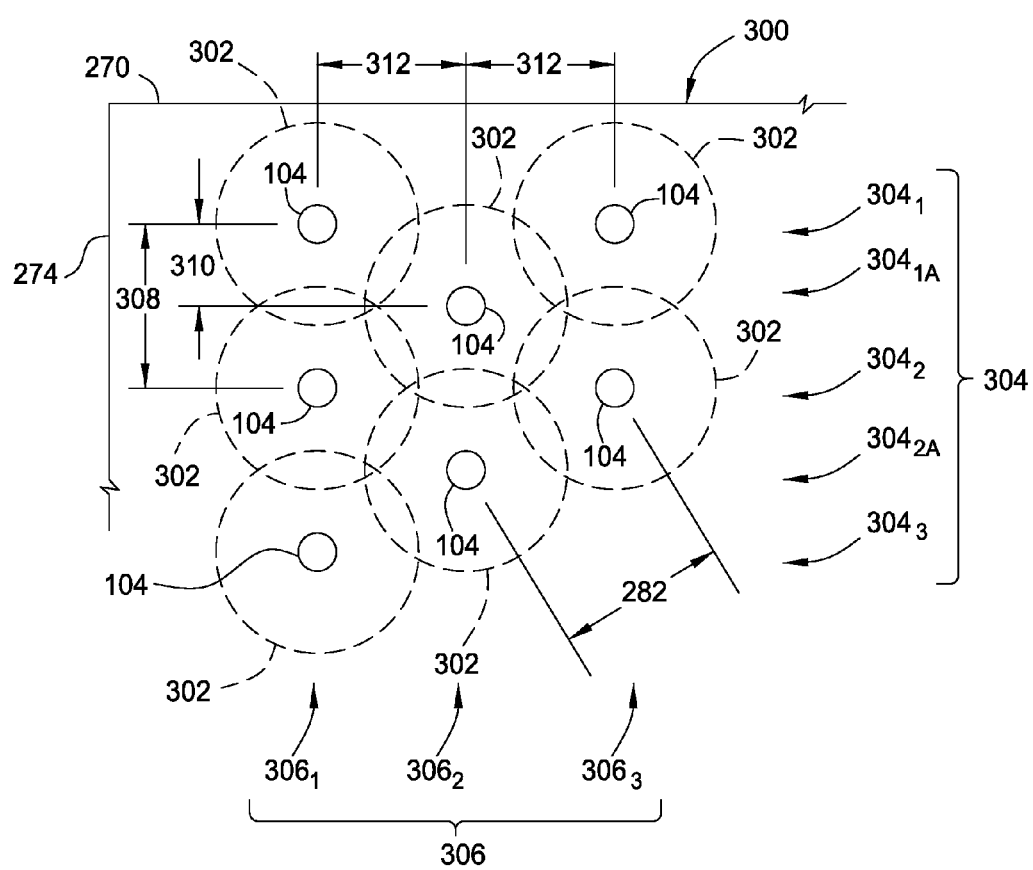
FIG. 3 is a schematic diagram of another embodiment of a material spray dispenser assembly.

FIG. 3 is a partial bottom view of another material electrospray dispenser assembly 300 having a 2-D array comprising rows 306 and columns 304 of nozzles 104. Although the 2-D array of nozzles 104 is shown in FIG. 3 arranged in rows 306 and columns 304, the 2-D array of nozzles 104 may have other configurations, such as a polar or other patterned arrangement. The material electrospray dispenser assembly 300 is constructed similar to the material electrospray dispenser assembly 120 described above, except wherein adjacent rows 306 are offset to create a nested pattern or an incrementally cascading pattern which allows better overlapping of the spray cones 302 (shown in phantom) of adjacent nozzles 104. For example, the nozzle center to center distance 282 is maintained by a distance 308 separating adjacent nozzles 104 within a row may be about 9 mm to about 30 mm (for example about 12 mm to about 20 mm) in row $306_1$, while a distance 310 separating adjacent nozzles 104 in adjacent rows, for example row $306_1$ to row $306_2$ or row $306_2$ to row $306_3$ may be less than the center to center distance 282. The distance 310 may be in the range of about 12 mm to about 80 mm, for example about 12 mm to about 40 mm, such as about 12 to 24 mm. However, the nozzle center to center distance 282 is maintained by a distance 312 separating adjacent nozzles 104 in adjacent columns, for example column $304_1$ to column $304_2$ or column $304_2$ to column $304_3$. In one embodiment, the distance 310 separating adjacent nozzles 104 in adjacent rows (i.e., the offset distance), is less than about half the center to center distance 282, and in one example is about 5 mm. The offset distance 310 is shown in FIG. 3 in offsetting each column 304 in the opposite direction than a neighboring column 304, however, two or more adjacent columns 304 may be incrementally offset the distance 310 in the same direction. The amount of offset is generally selected commensurate with the diameter of the spray cones 302 which can vary with nozzle 104 flow rates and electric field strengths.

Figure 4:
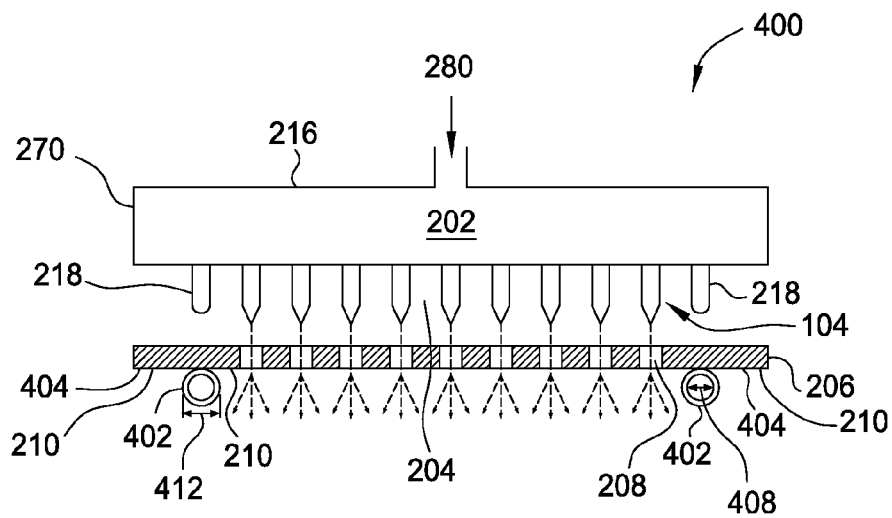
FIG. 4 is a schematic diagram of another material spray dispenser assembly with edge rings for forming a battery-active material layer on a substrate according to another embodiment of the present invention.

FIG. 4 is a schematic diagram of another material spray dispenser assembly 400 with edge rings 402 disposed at edges 404 of the material spray dispenser assembly 400. The material spray dispenser assembly 400 includes a 2-D array of nozzles 104, similar to the material electrospray dispenser assemblies 120, 300 described above. The edge ring 402 is disposed on an edge 404 of the extractor plate 206 and runs adjacent to all the nozzles 104 in the column (for example, as illustrated by columns 242, 304 depicted in FIGS. 2-3) proximate to the edge 404. The edge ring 402 is disposed on the lower surface 210 of the extractor plate 206. In operation, a voltage may be applied to the edge ring 402 to charge the edge ring 402 to the same polarity as the nozzles 104 in the column proximate the edge 404. In one embodiment, the voltage applied to the edge ring 402 may be at the same voltage as the voltage applied to the nozzles 104 in the column proximate the edge 404. By doing so, the electric field generated by the charged edge ring 402 may deflect the deposition material passing through the adjacent apertures 208 of the extractor plate 206 inward, so as to reduce the tendencies of the spray exiting the edge nozzles 104 from tilting outward. In one embodiment, the edge ring 402 may be a tube having a length substantially similar to the length of the extractor plate 206, which is generally the same as the length 288 of the manifold 202. In another embodiment, the edge ring 402 may be in a ring form which circumscribes the entire array of nozzles 104, thus being disposed along both edges 270 and both edge 274 which are illustrated in FIG. 2B. In yet another embodiment, the edge ring 402 may have a hollow body disposed along the edges 404 of the extractor plate 206. The edge ring 402 may have an inner diameter 408 between about 0.5 mm and about 5.0 mm and an outer diameter 412 between about 1 mm and about 20 mm.

Figure 5:
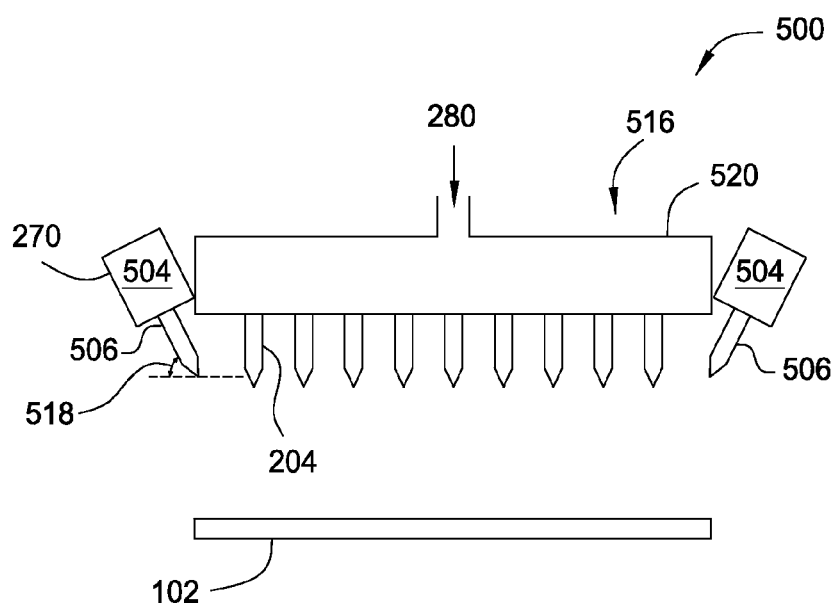
FIG. 5 is a schematic diagram of another material spray dispenser assembly with angled nozzles for forming a battery-active material layer on a substrate according to another embodiment of the present invention.

FIG. 5 depicts another embodiment of a material spray dispenser assembly 500 having a plurality of outer nozzles 506 angled inward or otherwise configured to provide an inward spray trajectory. The outer nozzles 506 are defined along at least one perimeter edge 270 of a manifold 520 of the material spray dispenser assembly 500 that is aligned with the direction of substrate travel (as shown in FIG. 2B). The manifold 520 may include an outer plate 504 which is disposed at opposite ends of a center plate 516. The angled outer nozzles 506 may extend at an acute angle from the outer plate 504 or, alternatively, the angled outer nozzles 506 may extend normally from outer plate 504 in embodiments where the outer plate 504 is oriented at an angle relative to the center plate 516. Although only one nozzle 506 is shown extending from the outer plate 504 in FIG. 5, it is noted that additional nozzles 506 comprise the column 242 that extends along the edge 270. The angle of the nozzles 506 in the material spray dispenser assembly 500 may be adjusted to control the angle of electrode forming solution exiting the nozzles 506 projected onto the substrate 102 so as to efficiently minimize the edge nozzle effects described above that may impact film uniformity. In one embodiment, the nozzles 506 may have projecting angle 518 between about 10 degrees and about 60 degrees to a horizontal plane parallel to the surface of the substrate 102.

In some embodiments, the outer nozzles 506 are positioned only along the edges 270 of the manifold 520 to provide good deposition thickness uniformity control along the opposite edges of the substrate 102 when the substrate is in web form and being continuously passed below the material spray dispenser assembly 500 (such as shown in FIG. 2B). In other embodiments, the outer nozzles 506 are positioned along both the edges 270 and edges 274 (shown in FIG. 2B) to run completely along the perimeter of the manifold 520 and to completely surround the inner nozzles 104. Having the outer nozzles 506 run completely around the perimeter of the manifold 520 provides good deposition thickness uniformity control along the four edges of the substrate 102 when the substrate is in discrete sheet form and being positioned stationarily below the material spray dispenser assembly 500 during deposition.

Figure 6:
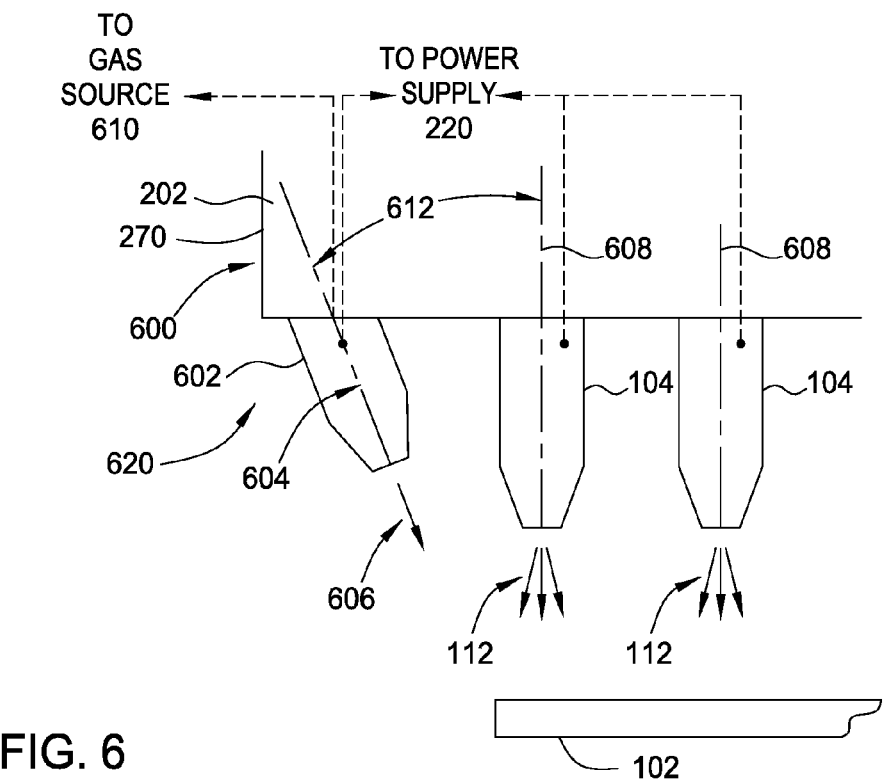
FIG. 6 is a schematic diagram of another material spray dispenser assembly with gas curtains for forming a battery-active material layer on a substrate according to another embodiment of the present invention.

FIG. 6 is a partial sectional view of another embodiment of a material spray dispenser assembly 600 having an air curtain generator 620. In one embodiment, the air curtain generator 620 is located between the laterally outermost column 242 of the 2-D array of nozzles 104 disposed on the manifold 202 and the edge 270 that is aligned with the edge of the substrate 102 (as shown in FIG. 2B). Alternatively, the air curtain generator 620 may be disposed completely around the perimeter of the manifold 202, thereby surrounding the nozzles 104 utilized to deposit the battery active material. The air curtain generator 620 includes one or more nozzles 602 that provide a gas jet, such as air or inert gas provided from a gas source 610, which biases the electrode forming solution 112 exiting the adjacent nozzle 104 inward to compensate for imbalances in the electric fields which may cause the spray of electrode forming solution 112 to bend outward. A centerline 604 of the nozzles 602 (aligned with the trajectory of the solution 112 exiting therefrom)

may be parallel with a center line 608 of the adjacent nozzles 104. Alternatively, centerline 604 of the nozzles 602 may be at an acute angle 612 relative to the center line 608 of the adjacent nozzle 104. Optionally, the gas exiting the nozzles 602 of the manifold 202 may be heated to assist drying of the deposited material.

Optionally, the nozzles 602 of air curtain generator 620 may be coupled to the power source 220 such that the voltage applied to the nozzles 602 is substantially the same as that of the nozzles 104. By applying a voltage to the nozzles 602, the nozzles 602 will function similar to the dummy nozzle 218 described above.

In yet another embodiment, the air curtain generator 620 may be incorporated into the nozzles 104 at one or both of the edges 270, 274. For example, the nozzle 104 may include one passage coupled to the deposition material source 280 and another passage coupled to the gas source 610, wherein the passage coupled to the gas source 610 is positioned closer to the edge of the manifold 202 so that the electrode forming solution 112 exiting the nozzle 104 may be directed inward or at least vertically by the stream of gas exiting the adjacent passage within the nozzle 104.

Figure 7:
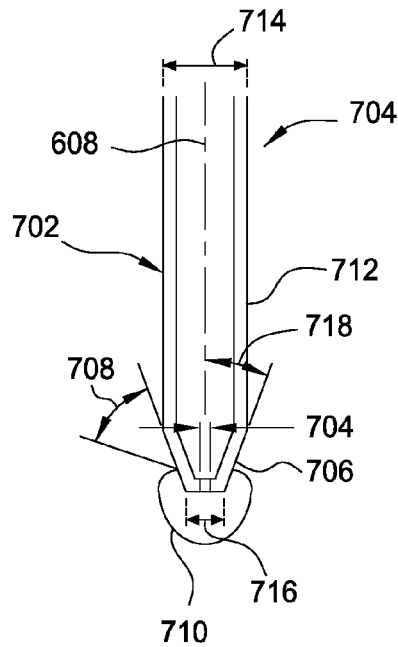
FIG. 7 is a cross sectional view of a nozzle that can be used in a material spray dispenser assembly.

FIG. 7 is an enlarged partial cross sectional view of the nozzle 104. In the embodiment depicted in FIG. 7, the nozzle 104 has a cylindrical body 702 having a cylindrical sleeve 712 coupled to a tip 706. The tip 706 tapers from the cylindrical sleeve 712. The cylindrical sleeve 712 has a first outer diameter 714 and a distal end of the tip 706 has a second outer diameter 716. The second outer diameter 716 is smaller than the first outer diameter 714, thereby defining a taper of the tip 706. In one embodiment, the taper of the tip 706 relative to a centerline of the nozzle 104 is less than about 49 degrees, for example about 45 degrees (having a plus 0 minus 4 degrees tolerance) as illustrated by reference numeral 708.

The deposition material exiting the nozzle 104 may wet and creep up the tip 706 of the nozzle 104, thereby undesirably increasing the diameter of the stream of materials exiting the nozzle, making process control difficult and undesirably increasing potential arcing between nozzles. Selecting a ratio between the first outer diameter 714 and an inside diameter 718 through which the electrode forming solution flows balances the ability to obtain high deposition rates while minimizing the potential for arcing between nozzles. For example, it has been demonstrated that a ratio between the first outer diameter 714 and the inside diameter 718 of 4:1 and 3:1 will provide good deposition results without arcing when nozzles 104 are spaced at distances as close as 12 mm or even 9 mm between nozzle centerlines.

In certain embodiments, the effective diameter of the material exiting from the tip 706 towards the substrate surface may be controlled by a hydrophobic coating applied to an exterior of the tip 706 and/or the body 702 of the nozzle 104 to change (i.e., increase) the contact angle 708 formed between the droplet and the tip 706 of the nozzle 104 and to prevent wetting of the nozzle by the deposition material. In one embodiment, the contact angle 708 may be controlled greater than 20 degrees, such as greater than 30 degrees, for example between about 20 degrees and about 90 degrees. In one embodiment, the hydrophobic coating utilized to coat on the tip 706 may be polytetrafluoroethylene (PTFE), perfluorodecyltrichlorosilane (FDTS) and the like.

It has also been found that fabricating the tip 706 to have a smooth exterior surface will also minimize wetting of the nozzle 104. In one embodiment, the exterior surface of the tip 706 is fabricated to have a surface roughness of about 16 Ra or smoother.

While the foregoing is directed to embodiments of the invention, other and further embodiments of the invention may be devised without departing from the basic scope thereof.

What is claimed is:

1. An apparatus for depositing a battery active material on a surface of a substrate comprising:
    a substrate conveyor for transporting the within the apparatus;
    a material spray assembly disposed above the substrate conveyor, the material spray assembly having a 2-D array of nozzles configured to electrospray an electrode forming solution on the surface of the substrate, wherein the 2-D array of nozzles of the material spray assembly further comprises a first nozzle disposed at an edge of the material spray assembly and a second nozzle disposed inward of the first nozzle, the first nozzle being longer relative to the second nozzle; and
    a first heater disposed adjacent to the material spray assembly above the substrate conveyor configured to heat the substrate.

2. The apparatus of claim 1, wherein the first nozzle is disposed at an edge of the material spray assembly and the 2-D array of nozzles further comprises:
    a second nozzle disposed inward of the first nozzle from the edge, the first nozzle having an inward inclination relative to the second nozzle.

3. The apparatus of claim 1, wherein the material spray assembly further comprises:
    an edge zone and a center zone, the edge zone having a density of nozzles different than that of the center zone.

4. The apparatus of claim 1, wherein the material spray assembly further comprises:
    an edge zone and a center zone, the edge zone having nozzles about 5 mm to about 10 mm closer to the substrate than nozzles disposed in the center zone.

5. The apparatus of claim 1, wherein the material spray assembly further comprises:
    a manifold having the plurality of nozzles extending therefrom; and
    an extractor plate positioned between the nozzles and the substrate conveyor, wherein the extractor plate further comprises a plurality of apertures formed in the extractor plate aligning with the nozzles formed in the manifold.

6. The apparatus of claim 1, wherein the material spray assembly further comprises:
    an air curtain generator configured to direct a trajectory of spray exiting adjacent nozzles inward.

7. The apparatus of claim 1, wherein the material spray assembly further comprises at least one dummy nozzle including the first nozzle.

8. The apparatus of claim 1, wherein the 2-D array of nozzles further comprises:
    a column of edge nozzles located along an edge of the material spray assembly, the edge nozzles having a spray trajectory angled inward towards a center of the material spray assembly.

9. The apparatus of claim 1, wherein the 2-D array of nozzles further comprises:
    a plurality of zones configured to provide independent control of deposition attributes.

10. The apparatus of claim 1, wherein the 2-D array of nozzles further comprises:
    a row of nozzles having nozzle to nozzle spacing of between about 9 mm to about 30 mm.

11. The apparatus of claim 1, wherein the 2-D array of nozzles further comprises:
a plurality of columns, each column comprising multiple nozzles.

12. The apparatus of claim 11, wherein the plurality of columns comprises:
a first column offset from a second column.

13. The apparatus of claim 11, wherein the plurality of columns comprises:
a first column offset from a second column by a distance of up to about 15 mm.

14. The apparatus of claim 1, wherein the 2-D array of nozzles are spaced from the substrate conveyor by a distance between about 10 mm to about 60 mm.

15. An apparatus for depositing a battery active material on a surface of a substrate comprising:
a substrate conveyor for transporting the substrate within the apparatus;
a plurality of material spray assemblies disposed above the substrate conveyor, the material spray assemblies each having a 2-D array of nozzles configured to electrospray an electrode forming solution on the surface of the substrate while disposed on the substrate conveyer, at least one of the 2-D array of nozzles having a row of nozzles having nozzle to nozzle spacing of between about 9 mm to about 30 mm; and
a plurality of heaters disposed between the material spray assemblies above the substrate conveyor configured to heat the substrate, wherein the 2-D array of nozzles on at least one of the material spray assemblies further comprises:
a first nozzle disposed at an edge of the at least one material spray assembly and a second nozzle disposed inward of the first nozzle, the first nozzle being longer relative to the second nozzle.

16. The apparatus of claim 15, wherein at least one of the material spray assemblies further comprises:
a plurality of dummy nozzles disposed on the material spray assembly outward of the 2-D array of nozzles.

17. The apparatus of claim 15, wherein the 2-D array of nozzles on at least one of the material spray assemblies further comprises:
a first column offset from a second column.

18. The apparatus of claim 15, wherein at least one of the material spray assemblies further comprises:
air curtain generator configured to direct or deflect a trajectory of spray exiting adjacent nozzles inward.

19. An apparatus for depositing a battery active material on a surface of a substrate comprising:
a substrate conveyor for transporting the substrate within the apparatus;
a material spray assembly disposed above the substrate conveyor, the material spray assembly having a 2-D array of nozzles configured to electrospray an electrode forming solution on the surface of the substrate; and
a first heater disposed adjacent to the material spray assembly above the substrate conveyor configured to heat the substrate, wherein the material spray assembly further comprises:
an edge zone and a center zone, the edge zone having nozzles about 5 mm to about 10 mm closer to the substrate than nozzles disposed in the center zone.

* * * * *